Oct. 5, 1943.  P. R. LEE  2,331,202

THERMOSTAT

Filed June 10, 1942

WITNESSES:
E. A. McCloskey.
H. C. Hepler.

INVENTOR
Paul R. Lee.
BY
W. R. Coley
ATTORNEY

Patented Oct. 5, 1943

2,331,202

UNITED STATES PATENT OFFICE 2,331,202

THERMOSTAT

Paul R. Lee, Mansfield, Ohio, assignor to Westinghouse Electric & Manufacturing Company, East Pittsburgh, Pa., a corporation of Pennsylvania Application June 10, 1942, Serial No. 446,435

9 Claims. (Cl. 200—122)

My invention relates to thermostats, and more particularly to slow make and break thermostats which are normally to operate with relatively low currents.

It is a well known feature about slow make and break thermostats that they must maintain a constant internal heat or wattage loss. If the internal heat loss be too high, the bimetal temperature will be higher than it should be. The thermostat will then cycle too rapidly resulting in a fluttering action of the contacts, producing radio interference and reducing the life of the contacts. If the wattage loss of the thermostat is too small, the greater portion of the temperature rise of the bimetallic element of the thermostat is produced substantially, if not entirely, by the heat received from the device being controlled. This feature will cause the thermostat to have a wide temperature differential.

When using a thermostat of this character on low current circuits normally encountered with 220-volt domestic appliances, such as roasters, irons, or the like, the wattage heat loss of the thermostat must be maintained at the normal value. The contact carrying arm must, therefore, have a small cross-sectional area for such low current requirements in order to increase the resistance, so as to maintain the desired necessary wattage loss.

However, inasmuch as the contact carrying arm has a reduced or small cross-sectional area, it follows that said arm will exert a very weak biasing force, resulting in a questionable contact pressure. This structure, therefore, causes fluttering of the contacts and, at times, even open circuits, as well as undesirably rapid cycling of the thermostat and appliance.

In solving these problems and providing a thermostat structure which will have a constant determinable watt loss, I have provided a second movable or flexible finger which is substantially parallel to the movable contact-carrying finger. This second finger is designed primarily to maintain the necessary constant pressure while the contact-carrying finger is designed to maintain the necessary watt loss. In other words, said contact-carrying finger is to function primarily as a heater for the bimetallic element.

It is, therefore, an object of my invention to provide a creep-type thermostat having a movable contact-carrying finger and a second biasing finger parallel therewith to maintain a constant relatively heavy contact pressure.

A further object of my invention is to provide a slow make and break creep-type thermostat which will have a constant predeterminable wattage loss.

Still a further object of my invention is to provide a thermostat having a flexible contact finger and a second biasing finger which engages the contact-carrying finger substantially in line with the movable contact carried thereby to maintain a constant biasing action in line with the movable contact at all times.

Other objects of my invention will either be pointed out specifically in the course of the following description of the device embodying my invention or will be apparent from such description and the accompanying drawing, in which.

Figure 1:
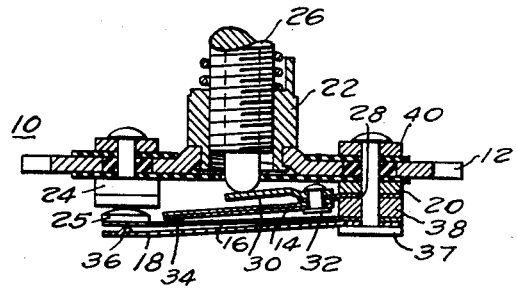
Figure 1 is a sectional view of a device embodying my invention.
Figure 2:
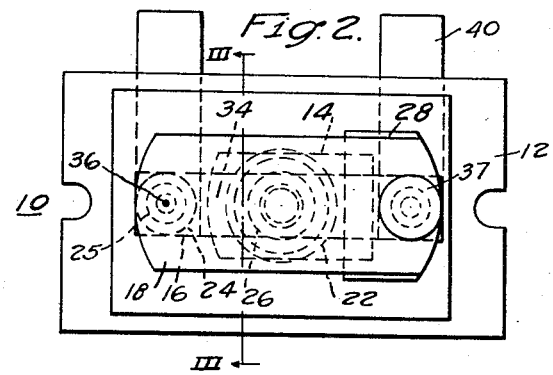
Fig. 2 is a bottom view thereof.
Figure 3:
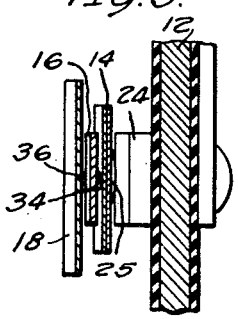
Fig. 3 is a sectional view taken along the line III—III of Fig. 2.

Referring to the accompanying drawing, in which like reference numerals indicate like parts in the several figures, there is shown a thermostat 10 embodying a supporting structure 12, a bimetallic element 14, a resilient contact-carrying finger 16 located below and engaged by the bimetallic member 14, a second resilient finger 18 positioned beneath and substantially parallel to the contact-carrying finger 16, and supporting means 20 for rigidly attaching the bimetallic member 14 and fingers 16 and 18 to the supporting structure 12.

The supporting structure 12 comprises, in this instance, a substantially flat rectangular metallic member. An upwardly extending threaded sleeve 22 is positioned substantially at the midpoint of the base 12 and rigidly attached thereto. In addition, a stationary contact 24 is insulatedly attached to the base 12, at one end thereof, and the mounting means 20 is insulatedly attached to the other end thereof. A suitable adjusting screw 26 is threadedly supported by the internally threaded bushing 22 for selectively adjusting the operation of the bimetallic element. This main combination is more clearly described and claimed in a copending application of E. K. Clark, Serial No. 394,469, filed May 21, 1941, and assigned to the assignee of this application.

Bimetallic element 14 is a relatively flat strip-type member. Said element 14 is rigidly attached to the supporting means 20 by means of a resilient member 28 which, in addition, carries a second member 30. The member 30 and bimetallic element 14 are rigidly attached to the free end of the resilient member 28 by means of a suitable rivet 32. The member 30 is formed from a flat metallic strip and is off-set upwardly so as to be engaged by the adjusting screw 26. The resilient member 28 biases the off-set member 30 into contact with the adjusting screw 26 at all times. The screw 26 is thus adapted to bodily move the bimetallic element 14 either downwardly or upwardly in response to the rotative movements of the adjusting screw 26.

The contact-carrying finger 16 is formed of a resilient current-carrying material. The width and thickness of said material is varied according to the resistance desired within said member or finger. The movable contact 25 is rigidly attached to the movable end of said finger so as to cooperate with the stationary contact 24. An upwardly extending protuberance 34 of any suitable form on finger 16 is located relatively near the movable contact 25 and is substantially in line and normally in contact with the free end of the bimetallic member 14. The bimetallic member 14 moves said contact-carrying finger 16 downwardly in response to an increase in temperature thereof so as to disengage the operating contacts 24 and 25.

The second resilient finger 18 comprises an elongated member having an upwardly extending embossed protuberance 36 located within its movable end portion. The protuberance 36 is substantially spherical in shape so as to make a point contact with finger 16. Said protuberance is positioned within the free end of the finger 18 directly in line or coaxial with the cooperating contacts 24 and 25, so as to maintain high contact pressure at all times and to ensure a positive action of said cooperating contacts during engagement and disengagemen thereof. Said second finger 18, while engaging the contact-carrying finger 16 and mounted in juxtaposition therewith, carries a relatively small amount of current due to the high electrical resistance between the two fingers. Said finger 18 thus provides additional contact pressure through engagement with the first finger 16.

The fingers 16 and 18 are rigidly attached to a mounting rivet or supporting member 37, for example, by being welded thereto, so as to have low electrical resistance therewith. Said rivet 37 is a part of the mounting means 20 and extends upwardly through a spacer washer 38. The upper end of said rivet or supporting member 37 is riveted or spun over upon a suitable terminal 40 in keeping with established practice. By having the contact carrying finger 16 and resilient finger 18 welded to the current-carrying rivet 37, it is clear that there is a very low resistance connection therebetween.

It, therefore, follows that the resistance through the contact carrying finger 16 from the mounting rivet 37 or terminal 40 to the stationary contact 24 is relatively low. In contrast therewith, it will be noted that due to the protuberance 36 merely engaging the contact carrying finger 16 at a single point, the electrical resistance from mounting rivet 37 or terminal 40 to stationary contact 24 through the finger 18 will be relatively high. Accordingly, the larger portion of current flowing through the thermostat 10 will pass through the contact-carrying finger 16, while the finger 18 will only carry a relatively small portion of the current. It is, therefore, obvious that the finger 18 is utilized primarily to bias the contact-carrying finger 16 upwardly and to carry as small a portion of the current flowing through the thermostat as is feasible due to the metallurgical and structural characteristics of said finger.

It is, therefore, obvious that I have provided a thermostat having a flexible contact-carrying finger which will carry substantially all of the current passing through the thermostat and I have also provided a second resilient biasing finger 18 which engages the contact-carrying finger at substantially one point in line with the movable contact so as to maintain a positive contact pressure at all times.

Various modifications may be made in the device embodying my invention without departing from the spirit and scope thereof and I desire, therefore, that only such limitations shall be placed thereon as are embodied in the prior art and the appended claims.

I claim as my invention:

1. In a thermostat having a bimetallic element, a movable contact-carrying member actuated by said element, a supporting structure and means for rigidly attaching said member and element to said structure, the combination of a second member mounted in juxtaposition, with said contact-carrying member, said second member biasing the contact-carrying member into a closed position, and a protuberance on said second member for engaging said contact-carrying member and constituting the sole point of contact between the movable portions of said members.

2. In a thermostat, embodying cooperating contacts, thermal responsive means, a supporting structure, and a first current-carrying arm rigidly attached to said structure, the combination of a second current-carrying arm located adjacent to said first arm and electrically in parallel therewith, the electrical resistance from one end to the other through said second arm being substantially greater than the resistance along said first arm, whereby the greater portion of current flowing through the thermostat will pass through said first arm.

3. In a thermostat, embodying a supporting structure, a first flexible current-carrying member attached by one end thereof to said supporting structure, a movable contact carried thereby, and a bimetallic member which flexes in response to the changes in temperature thereof mounted so as to engage and move said first current-carrying member, the combination of a second flexible current-carrying member mounted substantially parallel to said first flexible member, said first member making a high resistance engagement with said second member, whereby the resistance through said second member will be greater than that through said first member.

4. In a thermostat having a bimetallic element, a movable contact finger actuated by said element, a movable contact attached to and movable with said finger, a supporting structure and means for rigidly attaching said finger and element to said structure, the combination of a second finger mounted in juxtaposition with said contact finger, said second finger biasing the contact finger into a closed position, and a protuberance on said second finger for engaging the movable end of the contact finger, said protuberance being substantially in line with the contact carried by the contact finger.

5. In a thermostat, embodying a supporting structure, a first flexible current-carrying member attached by one end thereof to the supporting structure, a movable contact carried thereby, and a bimetallic member which flexes in response to changes in temperature thereof mounted so as to engage and move said current-carrying member, the combination of a second flexible current-carrying member mounted substantially parallel to said first flexible member, said first member making a high resistance engagement with said second member, whereby the resistance through said second member will be greater than that through said first member, said second member having a boss-like protuberance which is substantially in line with the contact carried by the contact finger.

6. In a thermostat having a supporting structure, a bimetallic element, a first resilient contact-carrying finger actuated by said element, and means for mounting said finger on the supporting structure, the combination of a second resilient finger mounted parallel to said first resilient finger, said second finger engaging said first finger at a point in line with the movable contact carried thereby, the electrical resistance from one end of said first finger to the movable contact through the second finger being substantially higher than the direct path through the first finger, whereby the larger portion of current flowing through the thermostat will pass through the first or contact-carrying finger.

7. In a thermostat having a supporting structure, a bimetallic element, a first resilient contact-carrying finger actuated by said element, and means for mounting said finger on the supporting structure, the combination of a second resilient finger mounted parallel to said first resilient finger, said second finger engaging said first finger at a point in line with the movable contact carried thereby, said second finger biasing said first finger into a contact closed position and maintaining a predetermined contact pressure when said contacts are in a closed position, the electrical resistance from one end of said first finger to the movable contact through said second finger being substantially higher than the direct path through said first finger, whereby the larger portion of current flowing through the thermostat will pass through said first or contact-carrying finger.

8. In a thermostat having a supporting structure, a bimetallic element, a first resilient contact-carrying member actuated by said element, and means for mounting said member on the supporting structure, the combination of a second resilient member mounted parallel to the first resilient member and rigidly attached at one end thereof in juxtaposition with said first member, the free end of said second member maintaining engagement with the free end of the first member through the biasing action of said second member to provide a predetermined contact pressure, the electrical resistance from the stationary end of said first member to the movable contact being greater through the second member than through the first member, whereby the current flowing through the first member will be greater than that through the second member.

9. In a thermostat having a support, a thermal responsive device, cooperating contacts including a movable contact, and a finger for carrying said movable contact, the combination of a second finger engaging the first finger in line with the movable contact for maintaining a positive contact pressure, said fingers being in parallel, with the resistance across said first finger and movable contact being relatively small and the resistance across the second finger and movable contact being relatively high.

PAUL R. LEE.